United States Patent
Machalani et al.

(10) Patent No.: US 9,519,471 B2
(45) Date of Patent: Dec. 13, 2016

(54) SURFACING VISUAL REPRESENTATIONS OF UNIVERSAL APPLICATIONS

(71) Applicant: Microsoft Technology Licensing, LLC, Redmond, WA (US)

(72) Inventors: Henri-Charles Machalani, Seattle, WA (US); Anshul Rawat, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/587,592

(22) Filed: Dec. 31, 2014

(65) Prior Publication Data

US 2016/0188308 A1 Jun. 30, 2016

(51) Int. Cl.
*G06F 9/445* (2006.01)
*H04L 12/24* (2006.01)
(Continued)

(52) U.S. Cl.
CPC ............... *G06F 8/61* (2013.01); *G06F 3/0482* (2013.01); *G06F 9/4443* (2013.01); *H04L 41/22* (2013.01);
(Continued)

(58) Field of Classification Search
None
See application file for complete search history.

(56) References Cited

U.S. PATENT DOCUMENTS 7,543,244 B2   6/2009  Matthews et al.
7,620,905 B2 * 11/2009  Boss ..................... G06F 3/0481
                                                            715/766

(Continued)

FOREIGN PATENT DOCUMENTS

EP         2741464 A1      6/2014
WO    WO-2014080547        5/2014

OTHER PUBLICATIONS

Munteanu, "Keep Track of the Apps That Were Installed on Your Windows 8.1 Devices", Retrieved From: <http://www.7tutorials.com/keep-track-apps-were-installed-your-windows-81-devices> Dec. 8, 2014, Mar. 25, 2014, 10 pages.
"International Search Report and Written Opinion Issued in PCT Application No. PCT/US2015/064175", Mailed Date: Mar. 3, 2016, 13 pages.
"Second Written Opinion Issued in PCT Application No. PCT/US2015/064175", Mailed Date: Jul. 13, 2016, 8 Pages.

*Primary Examiner* — Lewis A Bullock, Jr.
*Assistant Examiner* — Bruce S Ashley
(74) *Attorney, Agent, or Firm* — Aaron Chatterjee; Dan Choi; Micky Minhas

(57) ABSTRACT

Surfacing visual representations of universal applications is described. In one or more implementations, visual representations of universal applications purchased or installed on other devices associated with a user account are surfaced in an application launcher interface on a current computing device. The visual representations are selectable (e.g., with a single click or tap) to install the universal application on the current computing device. This enables the user to quickly and easily install universal applications already purchased on other devices onto a current device without having to perform any additional action, such as navigating away from the application launcher interface to enter payment information. In one or more implementations, the visual representations of the universal applications are surfaced under a "recently added" section and/or an "on other devices" section of the application launcher to enable the universal applications to be easily located by the user.

20 Claims, 12 Drawing Sheets

(51) Int. Cl.
*G06F 9/44* (2006.01)
*H04L 12/26* (2006.01)
*G06F 3/0482* (2013.01)
*H04L 29/08* (2006.01)

(52) U.S. Cl.
CPC ............... *H04L 67/34* (2013.01); *G06F 9/445* (2013.01); *H04L 43/045* (2013.01)

(56) References Cited

U.S. PATENT DOCUMENTS

| | | | |
|---|---|---|---|
| 8,214,754 B2* | 7/2012 | Zoller | G06F 9/4443 715/700 |
| 8,346,847 B2 | 1/2013 | Steakley | |
| 8,606,889 B2 | 12/2013 | Kazan et al. | |
| 8,745,617 B1 | 6/2014 | Stekkelpak et al. | |
| 8,813,060 B2 | 8/2014 | Tewari et al. | |
| 2010/0049890 A1* | 2/2010 | Best | G06F 3/023 710/73 |
| 2011/0004845 A1* | 1/2011 | Ciabarra | G06F 3/0481 715/808 |
| 2012/0036218 A1* | 2/2012 | Oh | G06F 17/30879 709/217 |
| 2012/0089974 A1* | 4/2012 | Cho | G06F 8/61 717/173 |
| 2012/0203862 A1 | 8/2012 | Tayeb et al. | |
| 2012/0204131 A1 | 8/2012 | Hoang et al. | |
| 2012/0290441 A1* | 11/2012 | Mahaniok | G06F 8/60 705/26.62 |
| 2012/0297041 A1 | 11/2012 | Momchilov | |
| 2013/0019237 A1 | 1/2013 | Pardehpoosh et al. | |
| 2013/0097516 A1* | 4/2013 | Hong | H04L 67/306 715/739 |
| 2013/0219381 A1 | 8/2013 | Lovitt | |
| 2013/0311986 A1* | 11/2013 | Arrouye | G06F 8/61 717/175 |
| 2013/0332886 A1 | 12/2013 | Cranfill et al. | |
| 2014/0040226 A1 | 2/2014 | Sadhukha et al. | |
| 2014/0173590 A1 | 6/2014 | Ein-Gal et al. | |
| 2014/0215457 A1 | 7/2014 | Gava et al. | |
| 2014/0258481 A1* | 9/2014 | Lundell | H04L 67/34 709/222 |
| 2014/0289658 A1* | 9/2014 | Gelernter | G06F 9/4443 715/765 |
| 2014/0298214 A1 | 10/2014 | Machalani et al. | |
| 2014/0379811 A1 | 12/2014 | Moss et al. | |
| 2015/0234645 A1* | 8/2015 | Ramachandran | G06F 8/61 717/178 |
| 2015/0346957 A1* | 12/2015 | Louch | G06F 3/04842 715/765 |

* cited by examiner

SURFACING VISUAL REPRESENTATIONS OF UNIVERSAL APPLICATIONS

BACKGROUND

Users often struggle to find newly installed applications on their devices. Some conventional solutions solve this problem by reflecting the recently installed applications in either a "Most Used" or "Recently Added" list. Increasingly, however, users own multiple devices of various form factors which are usable for different purposes. For example, a user may own a personal computer, a laptop, a tablet device, a smartphone, a gaming device, an e-reader, a fitness band, and so forth. In such a scenario, it is difficult for the user to preview the applications installed on other devices from the current device being used by the user.

SUMMARY

Surfacing visual representations of universal applications is described. In one or more implementations, visual representations of universal applications purchased or installed on other devices associated with a user account are surfaced in an application launcher interface on a current computing device. The visual representations are selectable (e.g., with a single click or tap) to install the universal application on the current computing device. This enables the user to quickly and easily install universal applications already purchased on other devices onto a current device without having to perform any additional action, such as navigating away from the application launcher interface to enter payment information.

In one or more implementations, the visual representations of the applications include a visual identifier which identifies where each application was originally installed. For example, an application originally installed on the user's smartphone may be surfaced with an image representing the smartphone to identify that the universal application was originally installed on the user's smartphone.

In one or more implementations, the visual representations of the universal applications are surfaced under a "recently added" section and/or an "on other devices" section of the application launcher interface to enable the universal applications to be easily located by the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The same numbers are used throughout the drawings to reference like features and components.

DETAILED DESCRIPTION

Overview

Figure 1:
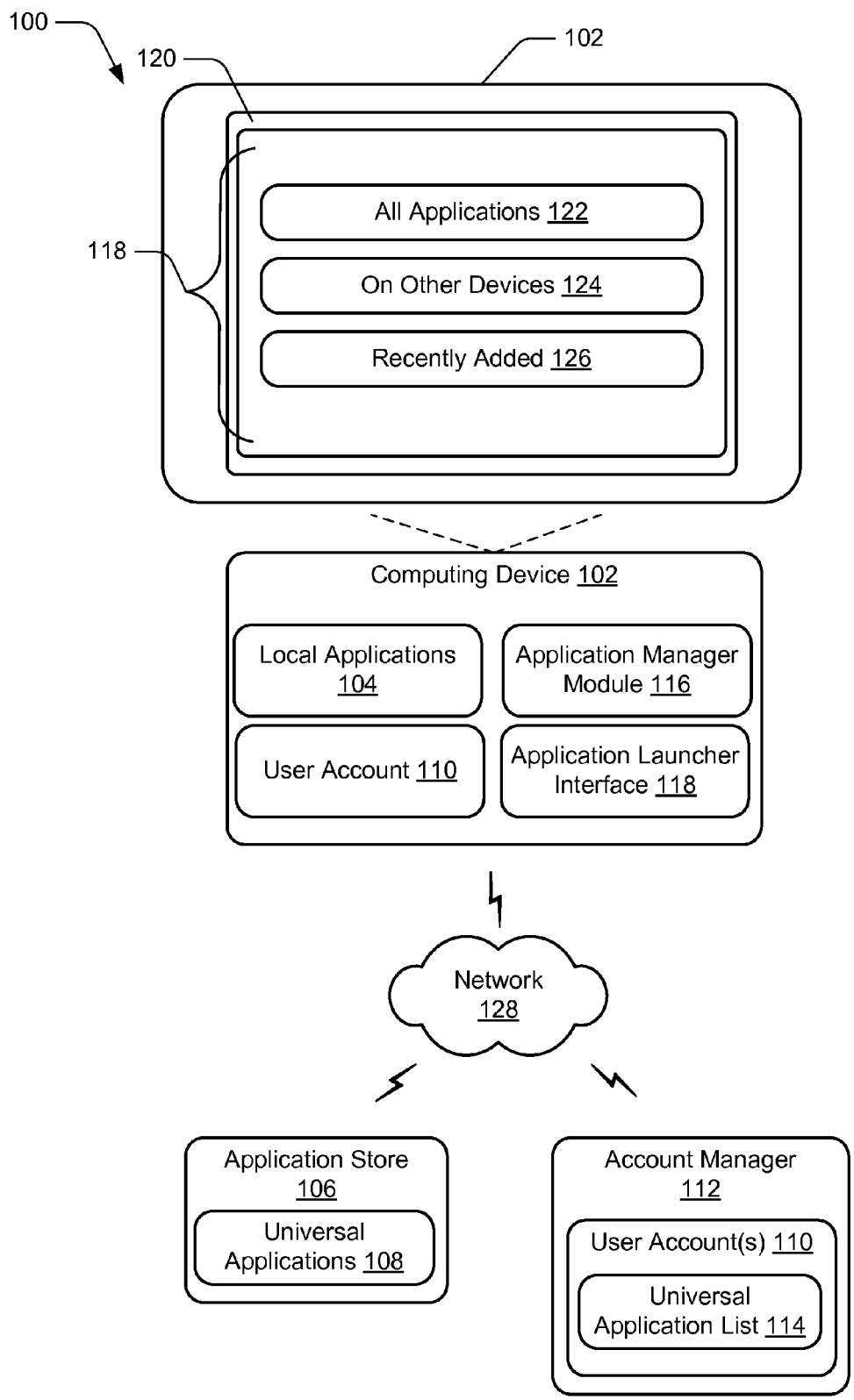
FIG. 1 is an illustration of an environment in an example implementation that is operable to support techniques described herein.

Surfacing visual representations of universal applications is described. In various implementations, a universal application model provides an application store which enables a user to purchase a "universal application" on one device, and install and run the same universal application across platforms on all of the user's devices.

As described herein, the term "universal application" may be used to refer to an application that can be purchased and installed on one device and usable on other devices associated with a same user account. Thus, a universal application can run across various platforms on devices with different form factors, such as smartphones, tablet devices, gaming devices, personal computers, and so forth.

Techniques described herein enable visual representations of universal applications purchased or installed on other devices associated with a user account to be surfaced in an application launcher interface on a current computing device. The visual representations are selectable (e.g., with a single click or tap) to install the universal application on the current computing device. This enables the user to quickly and efficiently install universal applications already purchased on other devices onto a current device without having to perform any additional action, such as navigating away from the application launcher interface to enter payment information.

In one or more implementations, the visual representations of the applications include a visual identifier which identifies where each application was originally installed. For example, an application originally installed on the user's smartphone may be surfaced with an image representing the smartphone to identify that the universal application was originally installed on the user's smartphone.

In one or more implementations, the visual representations of the universal applications are surfaced under a "recently added" section and/or an "on other devices" section of the application launcher. Surfacing the applications in this way makes it easy and efficient for the user to locate recently installed universal applications on multiple different devices.

Consider, for example, that a user installs Angry Birds on her smartphone at night before going to sleep. The next day, the user launches the start menu on her desktop computer and notices that Angry Birds is in the recently added section of the application launcher interface. The user can now easily and efficiently install the Angry Birds application with a single click, and continue playing the game on her desktop computer.

Notably, surfacing visual representations of the universal applications installed on other devices provides the user with the option to install each universal application, as opposed to automatically installing applications across each of the user's devices. Thus, the user can discriminately choose which of the universal applications purchased on other devices to install on the current device.

As an example, consider that the user buys a new laptop and does not want to use the cloud to restore the laptop to include all of the user's previously purchased universal applications. Instead, the user wants to manually select the applications to install on the new device. Further, the user wants to experience his new device at full capacity and doesn't want to bring over other applications which may slow down his new device. In this scenario, the described techniques enable the user to quickly set up the new device with only the applications the user cares about. For example, all of the universal applications that the user had installed on the user's other devices are available in the "on other devices" section of the application launcher interface, which enables the user to quickly and efficiently click-to-install the applications the user still cares about.

Example Environment

FIG. 1 is an illustration of an environment 100 in an example implementation that is operable to support techniques described herein. The illustrated environment 100 includes a computing device 102 that may be configured in a variety of ways. For example, computing device 102 may be configured as a traditional computer (e.g., a desktop personal computer, laptop computer, and so on), a mobile station, an entertainment appliance, a set-top box communicatively coupled to a television, a smartphone, a netbook, a game console, a handheld device (e.g., a tablet), a wearable device (e.g., a smartphone or a fitness band) and so forth as further described in relation to FIG. 7.

Computing device 102 includes "local" applications 104 which are representative of functionalities to perform various tasks via the computing device 102. Local applications 104 are considered "local" applications because they are installed locally at computing device 102. Examples of local applications 104 include gaming applications, word processor applications, email applications, content editing applications, web browsing applications, and so forth.

Environment 100 further includes an application store 106, which is representative of a resource that is remote from the computing device 102 and provides various universal applications 108 to computing device 102. For instance, application store 106 can provide universal applications 108 to computing device 102, such as via download and/or upload, responsive to a request to purchase or install universal applications 108.

As described herein, the term "universal application" may be used to refer to an application that can be purchased and installed on one device and usable on other devices associated with a same user account. Thus, a universal application can run across various platforms on devices with different form factors, such as smartphones, tablet devices, gaming devices, personal computers, and so forth.

Universal applications 108 which are downloaded to computing device 102 become local applications 104 for computing device 102. However, computing device 102 may also include local applications 104 other than the universal applications downloaded from application store 106, such as applications that come pre-installed on computing device 102 or purchased from a store other than application store 106.

Computing device 102 is associated with a user account 110 that is registered with application store 106. For example, a user of computing device 102 can enter authentication credentials, such as a username and password, to sign into user account 110 on computing device 102 to enable access to universal applications 108 from application store 106. Additionally, the user can sign into user account 110 on other devices in order to authorize the other devices with the user account.

For example, computing device 102 may be implemented as a tablet device, but the user may also own a smartphone, a gaming device, and a personal computer. Each of these devices may be associated with user account 110, and thus each device can request and download universal applications 108 that are purchased on any one of the devices from application store 106.

Environment 100 further includes an account manager 112, which is representative of a resource that is remote from computing device 102 and that can track universal applications 108 purchased and installed at devices associated with each user account 110. For each user account 110, account manager 112 generates a universal application list 114 which tracks the universal applications 108 purchased from application store 106 by devices associated with user account 110. While illustrated as separate components, in one or more implementations application store 106 and account manager 112 may implement as a single component and/or located at a single server.

Computing device 102 further includes an application manager module 116, which is representative of functionality to manage both local applications 104 installed on computing device 102 as well as universal applications 108 purchased on other devices associated with user account 110.

Application manager module 116 is configured to provide an application launcher interface 118 on a display 120 of computing device 102. Display 120 is representative of a device that is configured to output graphics for computing device 102. Application launcher interface 118 is configured to present visual representations (e.g., icons, tiles, and so forth) of local applications 104 installed on computing device 102 in an "all applications" 122 section of application launcher interface 118. The visual representations are selectable to launch the local applications 104 on computing device 102.

In accordance with various implementations, application manager module 116 is further configured to surface visual representations of universal applications 108 that have been installed on one or more devices associated with user account 110, but are not currently installed on computing device 102, in an "on other devices" 124 section and/or a "recently added" section 126 of application launcher interface 118. Thus, the visual representations preview or represent applications that have been purchased by the user, but are not yet installed on the current computing device 102. The visual representations are selectable (e.g., with a single click or tap) to download the application to computing device 102.

In one or more implementations, application launcher interface 118 is located in a "start" menu of computing device 102. Alternately or additionally, application launcher interface 118 is displayed on the display 120 as part of a primary screen of the computing device 102. The visual representations, for example, can be automatically presented as part of a first screen that is displayed when the computing device 102 is powered on (e.g., booted) from a power off state or when the user logs into user account 110 on computing device 102.

Further functionalities of application manager module 116 and application launcher interface 118 are discussed below.

Environment 100 further includes a network 128, which enables communication between computing device 102, application store 106, account manager 112, and various other entities. The network 128 can be implemented as a single network or a combination of different networks. Examples of the network 128 include a local area network (LAN), a wide area network (WAN), the Internet, and so forth.

Figure 2:
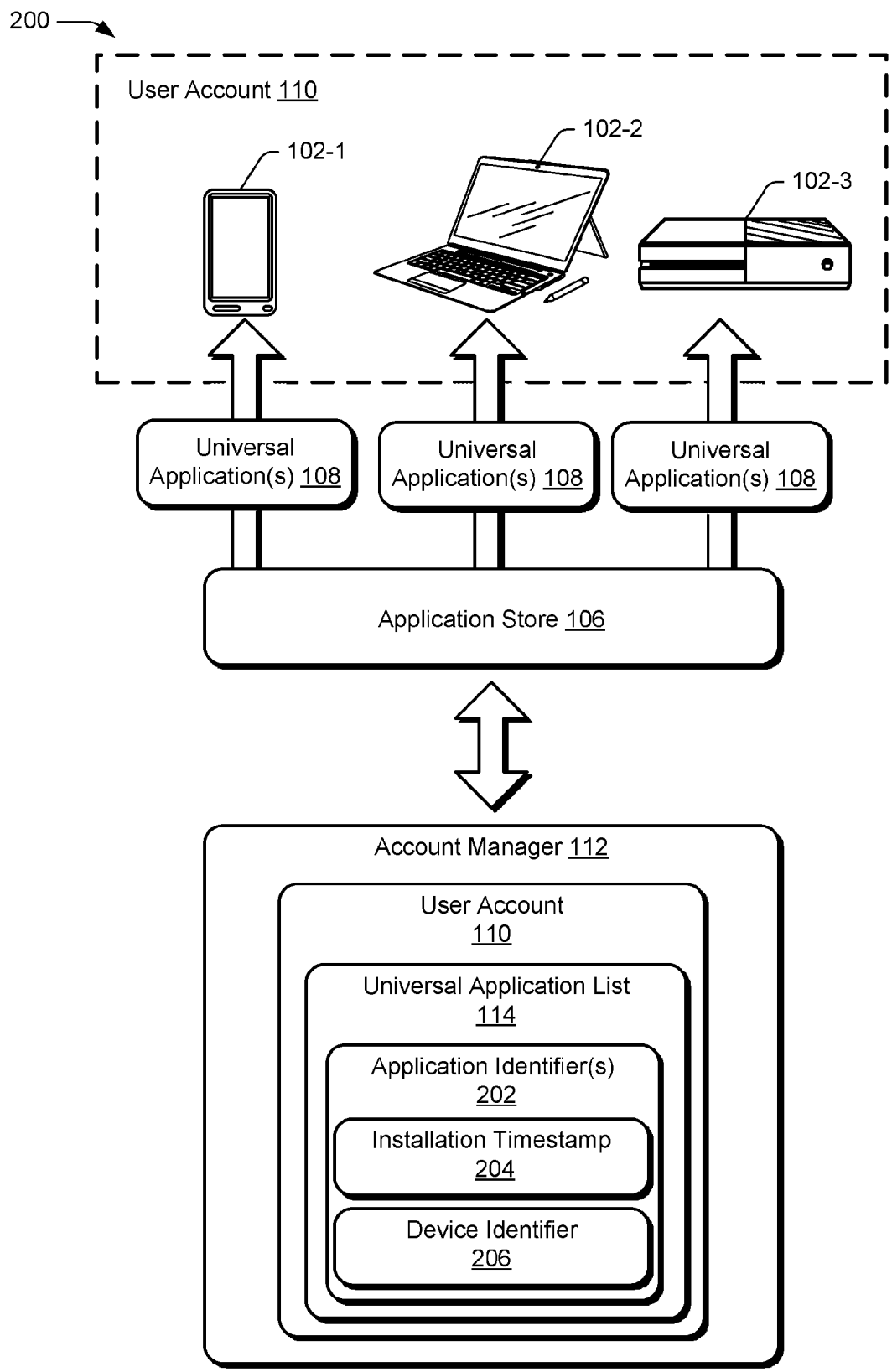
FIG. 2 illustrates a system in which devices associated with a user account download universal applications from an application store, and an account manager tracks the downloaded universal applications in accordance with one or more implementations

FIG. 2 illustrates a system 200 in which devices associated with a user account download universal applications from an application store, and an account manager tracks the downloaded universal applications in accordance with one or more implementations.

In this example, a user has authorized three different devices with a user account 110, a smartphone 102-1, a mobile device 102-2, and a gaming device 102-3. As described above, application store 106 enables the user to purchase, download, and install universal applications 108 at multiple different authorized devices. Thus, in this example, universal applications 108 are purchased and installed at each of devices 102-1, 102-2, and 102-3.

Account manager 112 communicates with application store 106 to track the applications installed using devices associated with user account 110. For each user account 110, account manager 112 generates a universal application list 114 that includes application identifiers 202 for each universal application 108 that is installed on at least one of the devices associated with user account 110. The application identifier 202, for instance, may correspond to a name and/or serial number of the each application.

In one or more implementations, account manager 112 stores an installation timestamp 204 with each application identifier 202. The installation timestamp 204 includes information identifying the time (e.g., date and time of day) that the corresponding application was installed. As will be described in more detail below, installation timestamp 204 can be used to identify recently added applications.

In one or more implementations, account manager 112 also stores a device identifier 206 with each application identifier 202. The device identifier 206 identifies the device (e.g., by name, serial number, type, and so forth) on which the respective application was installed. For example, an application purchased and installed on smartphone 102-1 may have an application identifier of "smartphone", "Windows Phone", or "John's Phone". In some cases, device identifier 206 may further include a visual identifier of the device, such as an icon representing the device on which the application was installed. As discussed in more detail below, the device identifier is usable by application manager module 116 to provide a visual identifier of the device at which each application was installed in the application launcher.

Figure 3:
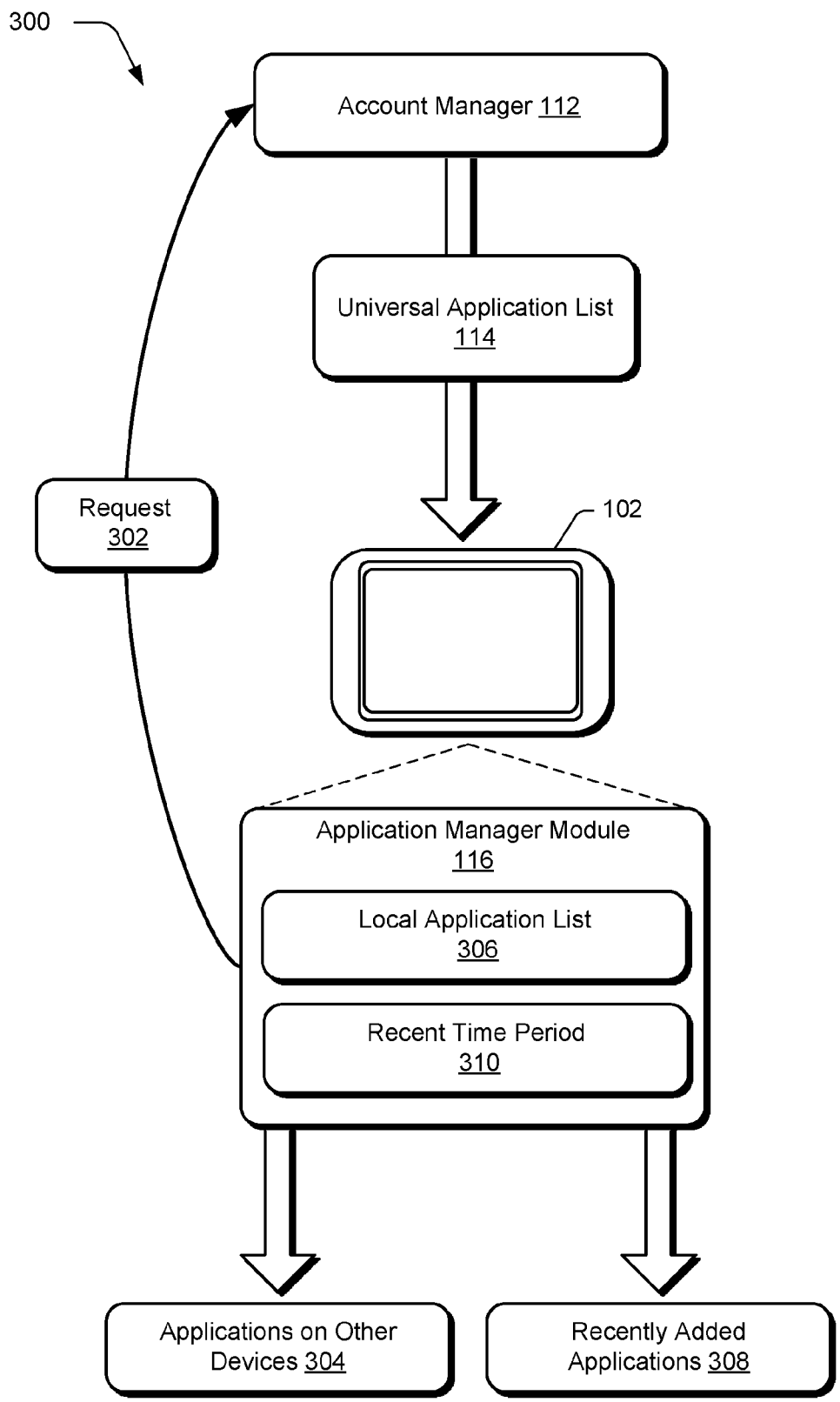
FIG. 3 illustrates a system in which an application manager module identifies applications on other devices and recently added applications in accordance with one or more implementations.

FIG. 3 illustrates a system 300 in which an application manager module identifies applications on other devices and recently added applications in accordance with one or more implementations.

In this example, application manager module 116 communicates a request 302 from computing device 102 to account manager 112. Request 302 may be communicated in response to a variety of different actions, such as the user logging into user account 110 on computing device 102, powering on computing device 102, and so forth. Request 302 may include an identifier of user account 110 to enable account manager to determine the user account associated with request 302.

Responsive to receiving request 302, account manager 112 communicates universal application list 114 to computing device 102. As discussed in FIG. 2, universal application list 114 may include application identifiers 202 corresponding to each universal application 108 purchased and installed on a device associated with user account 110. Universal application list 114 may also include, for each application identifier 202, an installation timestamp 204 and/or a device identifier 206.

In response to receiving universal application list 114, application manager module 116 determines applications "on other devices" 304. Applications "on other devices" 304 correspond to universal applications 108 that have been installed on at least one device associated with user account 110, but are not currently installed on the current computing device 102.

To identify applications "on other devices" 304, application manager module 116 compares universal application list 114 to a local application list 306. The local application list 306 is a list of the local applications 104 that are installed on computing device 102. In some cases, the local applications may have been previously downloaded and installed from application store 106. However, local applications 104 may also include applications installed from other sources.

Based on this comparison, application manager module 116 identifies applications on other devices 304 as the applications listed in universal application list 114 which are not listed in local application list 306.

In an alternate implementation, the applications on other devices 304 may be determined remote from computing device 102 by account manager 112. In this case, the universal application list may include only those applications that are not currently installed on computing device 102.

In one or more implementations, application manager module 116 is further implemented to identify recently added applications 308 which have been purchased or installed within a recent time period 310. Recent time period 310 may be predetermined, or configurable by the user, and may correspond to any time period, such as within the last 24 hours, the last week, and so forth.

Unlike conventional solutions, application manager module 116 includes universal applications 108, which are not currently installed on computing device 102, with recently added applications 308. To identify the recently added applications, application manager module 116 extracts installation timestamp 204 from the applications listed in universal application list. Application manager module 116 may extract a similar installation timestamp from local applications 104 which are not included in universal application list 114. Application manager module 116 compares installations timestamp 204 to the recent time period 310, and identifies the recently added applications 308 as the applications which have been installed within the recent time period 310.

Application manager module 116 is configured to surface visual representations of the applications on other devices 304 and the recently added applications 308 in application launcher interface 118. The visual representations of the applications can be selected by the user to quickly and easily download the applications to computing device 102.

In one or more implementations, application launcher interface 118 is implemented as part of a start menu to enable the user to quickly and efficiently find and install universal applications 108 that have been installed on other devices.

As noted previously, application launcher interface 118 may include an all applications section 122 which displays visual representations of local applications 104 which are currently installed on computing device 102, a recently added section 126 which displays visual representations of recently added applications 308, and an on other devices section 124 which displays visual representations of universal applications on other devices 304.

In one or more implementations, the recently added section 126 is displayed at the top of application launcher interface 118, followed by the all applications section 122, and the on other devices section 124 is displayed on the bottom of applications launcher interface 118. This configuration enables users to quickly and easily find recently added applications 308, while still being able to access applications installed on other devices even when they are no longer displayed in the recently added section.

Figure 4A:
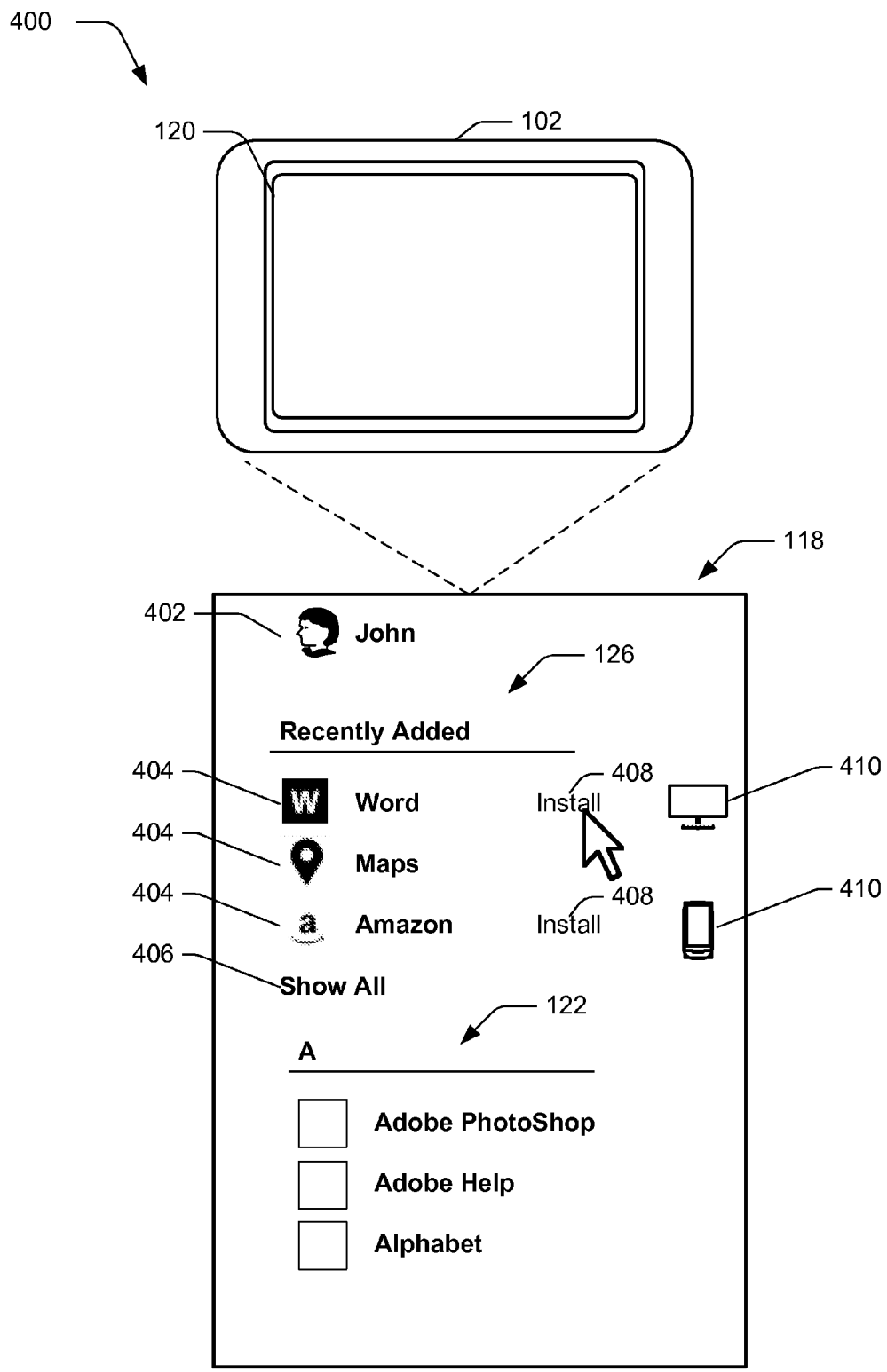
FIG. 4a illustrates an example of a recently added section of an application launcher interface in accordance with one or more implementations.

FIG. 4a illustrates an example 400 of a recently added section of an application launcher interface in accordance with one or more implementations.

In this example, application launcher interface 118 is displayed on display 120 of a tablet computing device 102. For purposes of this example, assume that a user named "John" owns tablet computing device 102, along with a smartphone, a gaming device, and a desktop computer, and that each of these devices are associated with John's user account 110.

Assume, also, that John has purchased and installed the following universal applications 108: the word processing application Microsoft Word on John's desktop, a maps application on John's tablet computing device, an e-commerce application by Amazon on John's smartphone, the gaming application Destiny on John's Xbox gaming device, the photo editing application FireArt on John's desktop computer, and the email application Outlook on John's desktop computer. For purposes of this discussion, assume that the order listed above is sorted from the most recent installation, thus the Microsoft Word application was most recently purchased by John.

In this case, account manager 112 may maintain the following universal application list:

TABLE 1

| Universal Application List for John's User Account | |
| --- | --- |
| Application Identifier 202 | Device Identifier 206 |
| Word | Desktop |
| Maps | Tablet |
| Amazon | Smartphone |
| Destiny | Gaming Device |
| FireArt | Desktop |
| Outlook | Desktop |

Now, when John logs into his user account 110, application launcher interface 118 displays a user account identifier 402 for John to identify that user account 110 is activated, and application manager module 116 surfaces visual representations 404 of recently added applications 308 in recently added section 126 of application launcher interface 118. As noted previously, recently added applications 308 correspond to applications recently installed and/or purchased during recent time period 310 (e.g., the last 24 hours) at computing device 102, or at another device associated with user account 110.

In this non-limiting example, visual representations 404 include a visual icon or image (e.g., a logo identifying the application) and a name of the application. It is to be appreciated, however, that any type or combination of visual representations or graphical elements can be used to identify recently added applications 308 in recently added section 126, including images, words, icons, logos, and so forth.

In example 400, recently added section 126 displays the three most-recently installed applications, Word, Maps, and Amazon. The applications are listed in order of installation, with the most-recently installed application, Word, listed at the top. Alternately, the recently added applications may be listed using different criteria, such as alphabetical order.

While recently added section 126 is illustrated as including three recently added applications 308, it is to be noted that recently added section 126 is not limited to displaying just three recently added applications, and in some implementations may display more than or less than three applications.

In this example, recently added section 126 further includes a show all control 406 which is selectable to expand the list to show all of the applications installed within recent time period 310. For example, selection of show all control 406 causes application launcher interface 118 to further display visual representations for the applications Destiny, FireArt, and Outlook, as long as the installation times are still within the recent time period.

Notably, recently added section 126 of application launcher interface 118 includes both local applications 104 installed on John's tablet device (e.g., Maps) as well as universal applications 108 installed on John's other devices (e.g., Word and Amazon) which are not yet installed on computing device 102.

For applications that have been installed on another device associated with John's user account 110, but are not yet installed on computing device 102, application manager module 116 displays an install control 408 and a visual device identifier 410 proximate the visual representation 404 of the application. The install control 408 and visual device identifier 410 inform the user that the applications purchased on other devices are available for download because they have already been purchased on another device associated with user account 110.

Visual device identifier 410 identifies the device at which the application was originally installed. For example, visual device identifier 410, displayed proximate the Word application, is an image representative of a desktop computer to identify that the Word application was originally installed on John's desktop computer. Similarly, the visual device identifier 410, displayed proximate the Amazon application, is an image representative of a smartphone to identify that the Amazon application was originally installed on John's smartphone. Of course, any type of graphical element can be used to identify the device on which an application is installed, such as text, images, logos, and so forth. Notably, the maps application does not include a visual device identifier 410 because the maps application is already installed locally on John's tablet computing device 102.

Install control 408 is selectable to download each respective application to computing device 102. In this example, John has selected install control 408 positioned proximate visual representation 404 of the Word application by placing a cursor over install control 408 and performing a single click. Of course, if tablet computing device 102 includes a touchscreen, then the install control could also be selected by John by simply tapping install control 408 with John's finger. In one or more implementations, the user can also select the visual representation 404, such as by clicking the applications logo or image, to initiate the download.

Responsive to selection of install control 408 or visual representation 404, application manager module 116 initiates download and installation of the respective application to tablet computing device 102, such as by transmitting a request to application store 106 to download the selected application. As discussed above, because John has already purchased the universal application using another device associated with user account 110, John does not need to enter payment information or navigate to application store 106 in order to install the application.

Figure 4B:
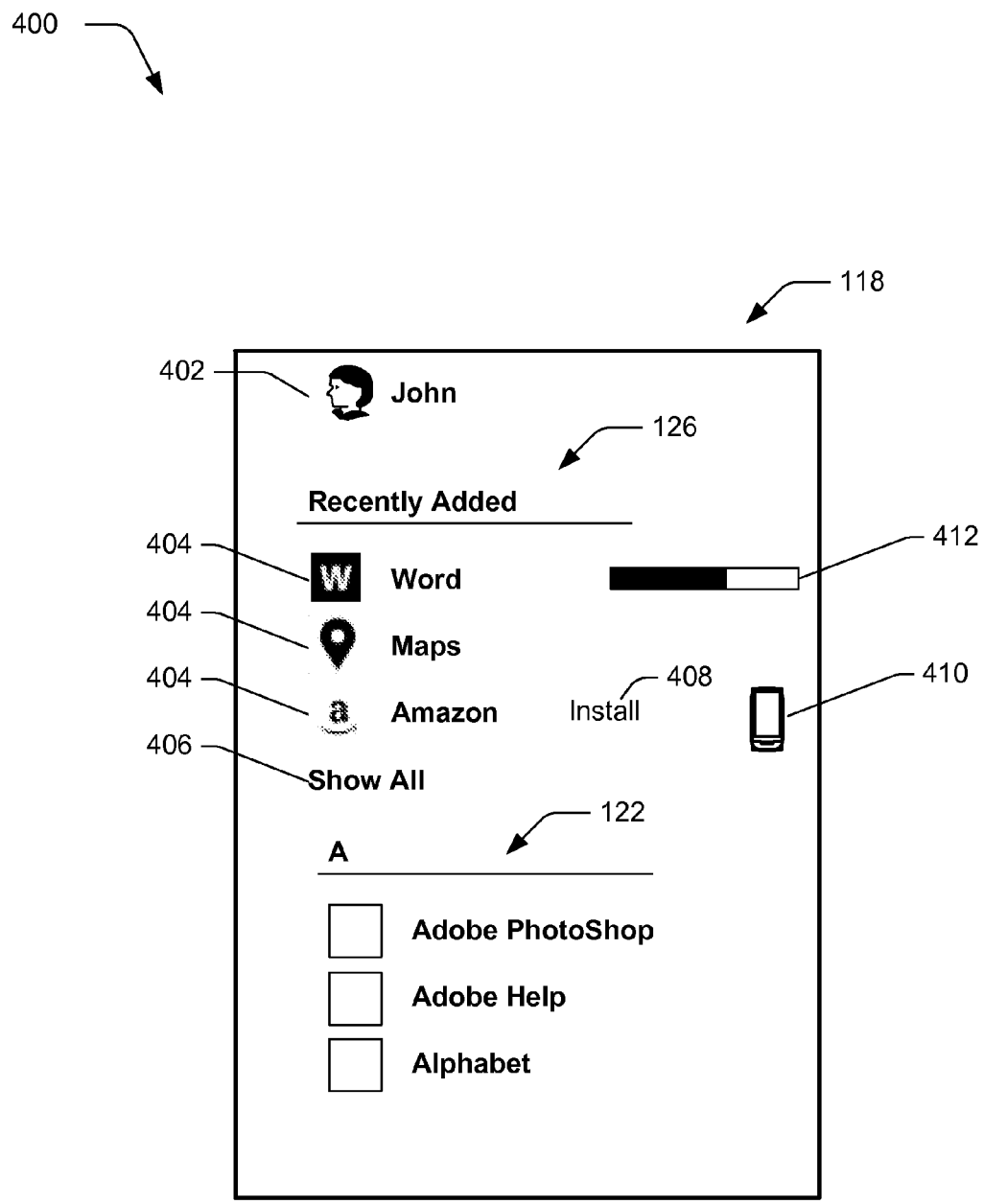
FIG. 4b illustrates an additional example of a recently added section of an application launcher interface in accordance with one or more implementations.

FIG. 4b illustrates an additional example of a recently added section of an application launcher interface in accordance with one or more implementations. In this example, responsive to selection of the install control 408 associated with the Word application, a download status visual 412 is displayed proximate the visual representation to indicate that the Word application is currently downloading to tablet computing device 102. In this example, a download status visual 412 is displayed in line with visual representation 404 and indicates the download status (e.g., the percentage of the application which has been downloaded).

Figure 4C:
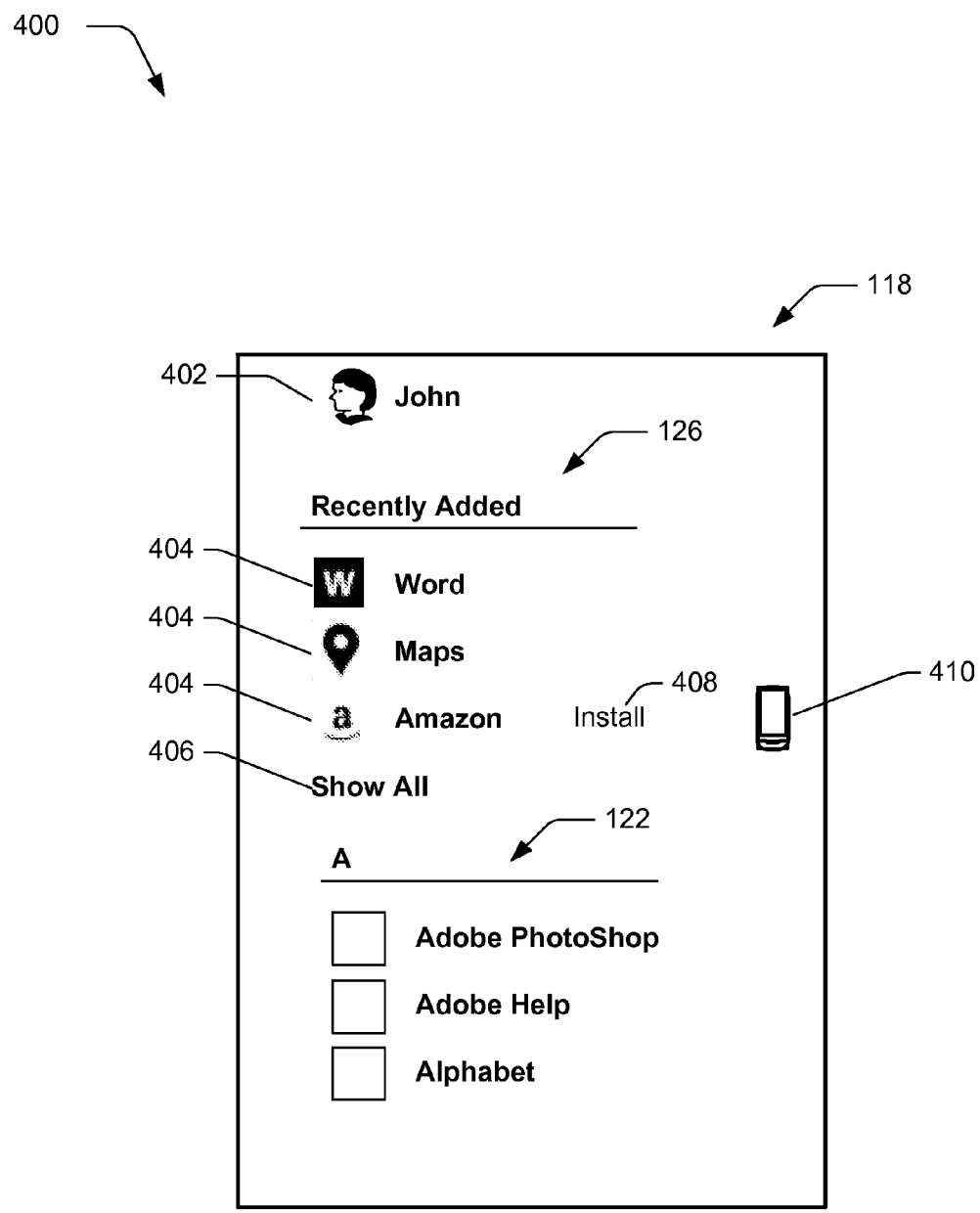
FIG. 4c illustrates an additional example of a recently added section of an application launcher interface in accordance with one or more implementations.

As illustrated in FIG. 4c, when the application is finished downloading, application manager module 116 removes the visual device identifier 410 and the install control 408 associated with the Word application because the Word application is now installed locally at tablet computing device 102. The user can now select the visual representation 404 associated with the Word application in order to launch Word at tablet computing device 102.

In this example, application manager module 116 displays an all applications section 122 below recently added section 126. As noted above, the all applications section 122 includes all of the local applications 104 installed on tablet computing device 102. In this case, the local applications 104 are listed in alphabetical order, starting with applications beginning with the letter "A", to enable the user to scroll downwards to locate the local applications. In all applications section 122, the visual representations of the applications are selectable in order to launch the applications at computing device 102.

Application manager module 116 is configured to remove the applications from recently added section 126 after the application's installation time no longer falls within the recent time period. However, the applications are still available for download in the on other devices section 124 of application launcher interface 118, which will now be discussed with regards to FIG. 4d.

Figure 4D:
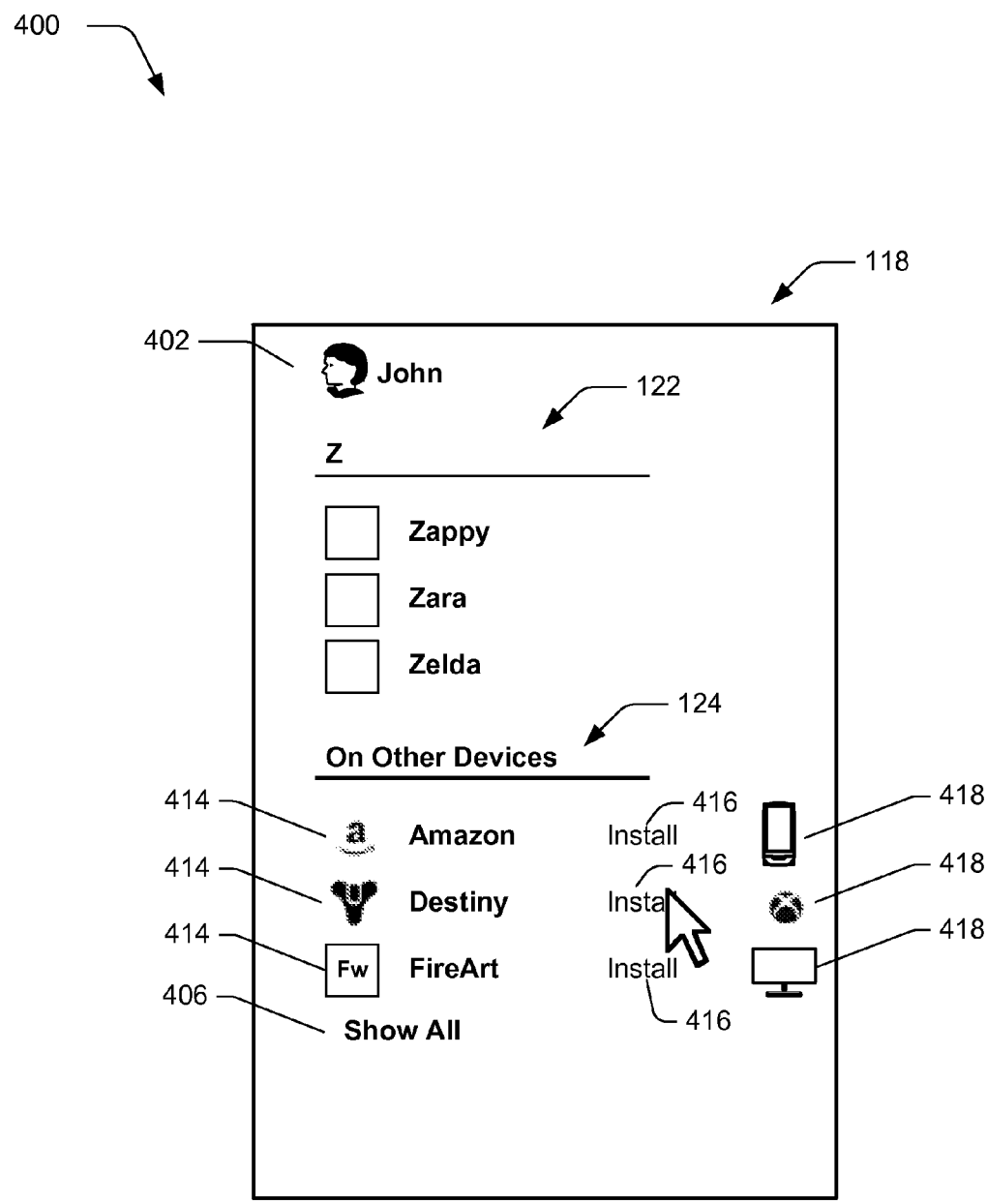
FIG. 4d illustrates an example of an on other devices section of an application launcher interface in accordance with one or more implementations.

FIG. 4d illustrates an example 400 of an "on other devices" section of an application launcher interface in accordance with one or more implementations.

Application manager module 116 surfaces visual representations 414 of the applications on other devices 304 in on other devices section 124 of application launcher interface 118. As noted previously, the applications on other devices 304 correspond to applications installed and/or purchased at one or more devices associated with user account 110 that are not yet installed on the current computing device 102. In this non-limiting example, the on other devices section 124 is displayed at the end of the all applications section 122 of application launcher interface 118.

Similar to the visual representations 404 displayed in recently added section 126, visual representations 414 include a visual icon or image (e.g., a logo identifying the application) and a name of the application.

In this example, "on other devices" section 124 displays three applications that are installed on John's other devices, the Amazon application, the Destiny Application, and the FireArt application. The applications may be ordered such that the most recently-installed applications, which in this example is the Amazon application, is listed at the top of "on other devices" section 124. Alternately, the applications "on other devices" may be listed using different criteria, such as alphabetical order.

Note that the "on other devices" section 124 of application launcher interface 118 does not include the Word or Maps application which were both included in the "recently added" section 126. The maps application is not included here because it was installed locally on tablet computing device 102. The word application is no longer listed in this section because John has installed the Word application to tablet computing device 102, as illustrated in FIGS. 4b and 4c.

While "on other devices" section 124 is illustrated as including three applications "on other devices" 304, it is to be noted that "on other devices" section 124 is not limited to displaying just three applications, and in some implementations may display more than or less than three applications. In one or more implementations, "on other devices" section 124 further includes a show all control 406 which is selectable to expand the list to show all of the applications installed "on other devices" which are not installed on computing device 102.

Similar to recently added section 126, application manager module 116 displays an install control 416 and a visual device identifier 418 proximate or in line with the visual representation 414.

Visual device identifier 418 identifies the device on which the application was originally installed. For example, visual device identifier 418, displayed proximate the Amazon application, is an image representative of a smartphone to identify that the Amazon application was originally installed on John's smartphone. Similarly, the visual device identifier 418, displayed proximate the Destiny application, is an image representative of an Xbox® gaming device to identify that the Destiny application was originally installed on John's Xbox gaming device. Similarly, the visual device identifier 418, displayed proximate the FireArt application, is an image representative of a desktop computer to identify that the FireArt application was originally installed on John's desktop computer.

Install control 416 is selectable to download each respective application to tablet computing device 102. In this example, John has selected install control 416 positioned proximate the visual representation 414 of the Destiny application by placing a cursor over install control 416 and performing a single click.

Responsive to selection of install control 416 or visual representation 414, application manager module 116 detects the selection and initiates download and installation of the respective application to tablet computing device 102, such as by transmitting a request to application store 106 to download the selected application.

Figure 4E:
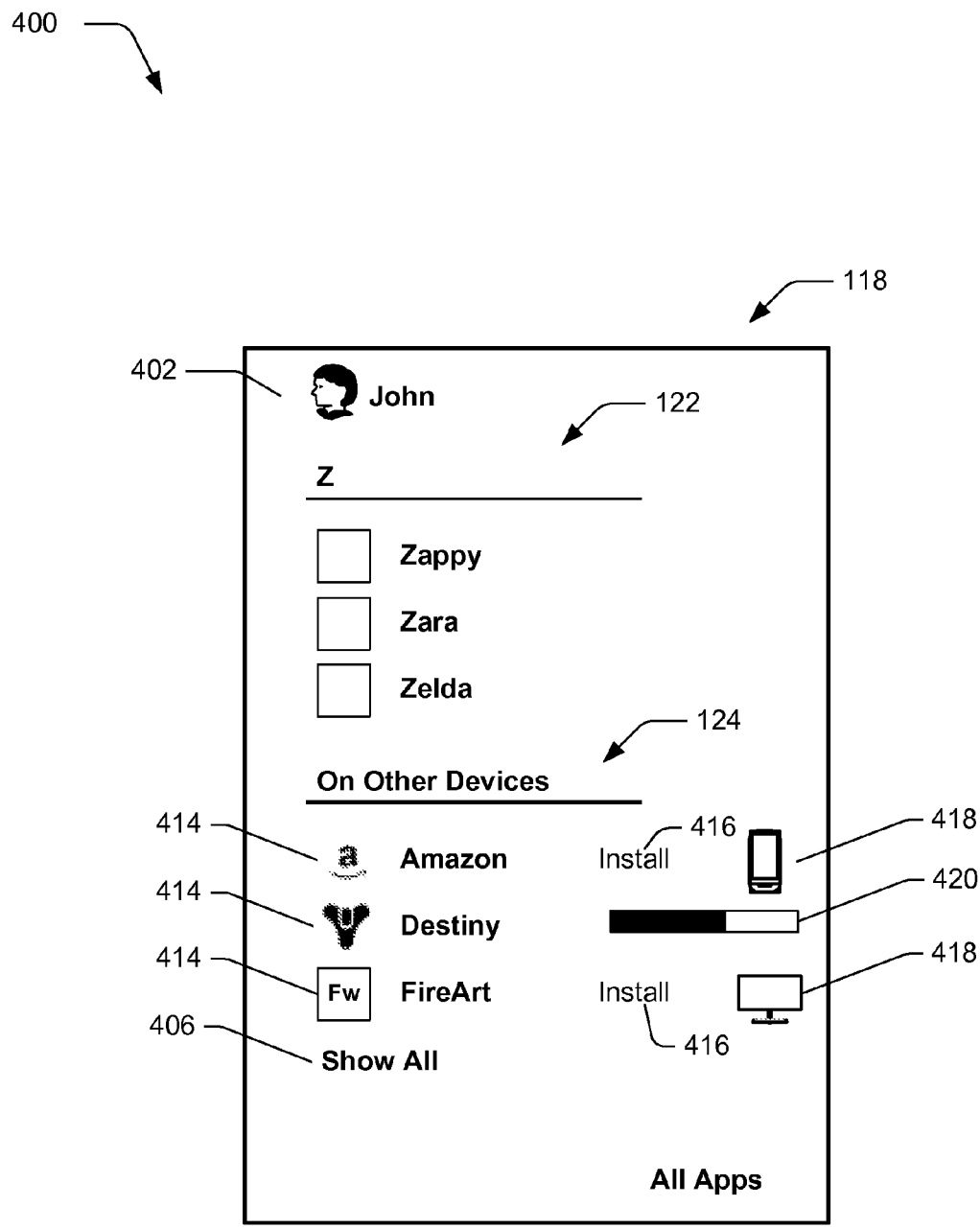
FIG. 4e illustrates an example of an on other devices section of an application launcher interface in accordance with one or more implementations.

FIG. 4e illustrates an additional example 400 of an on other devices section of an application launcher interface in accordance with one or more implementations.

In this example, responsive to selection of the install control 416 associated with the destiny application, a download status visual 420 is displayed proximate the visual representation to indicate that the Destiny application is currently downloading to computing device 102.

Figure 4F:
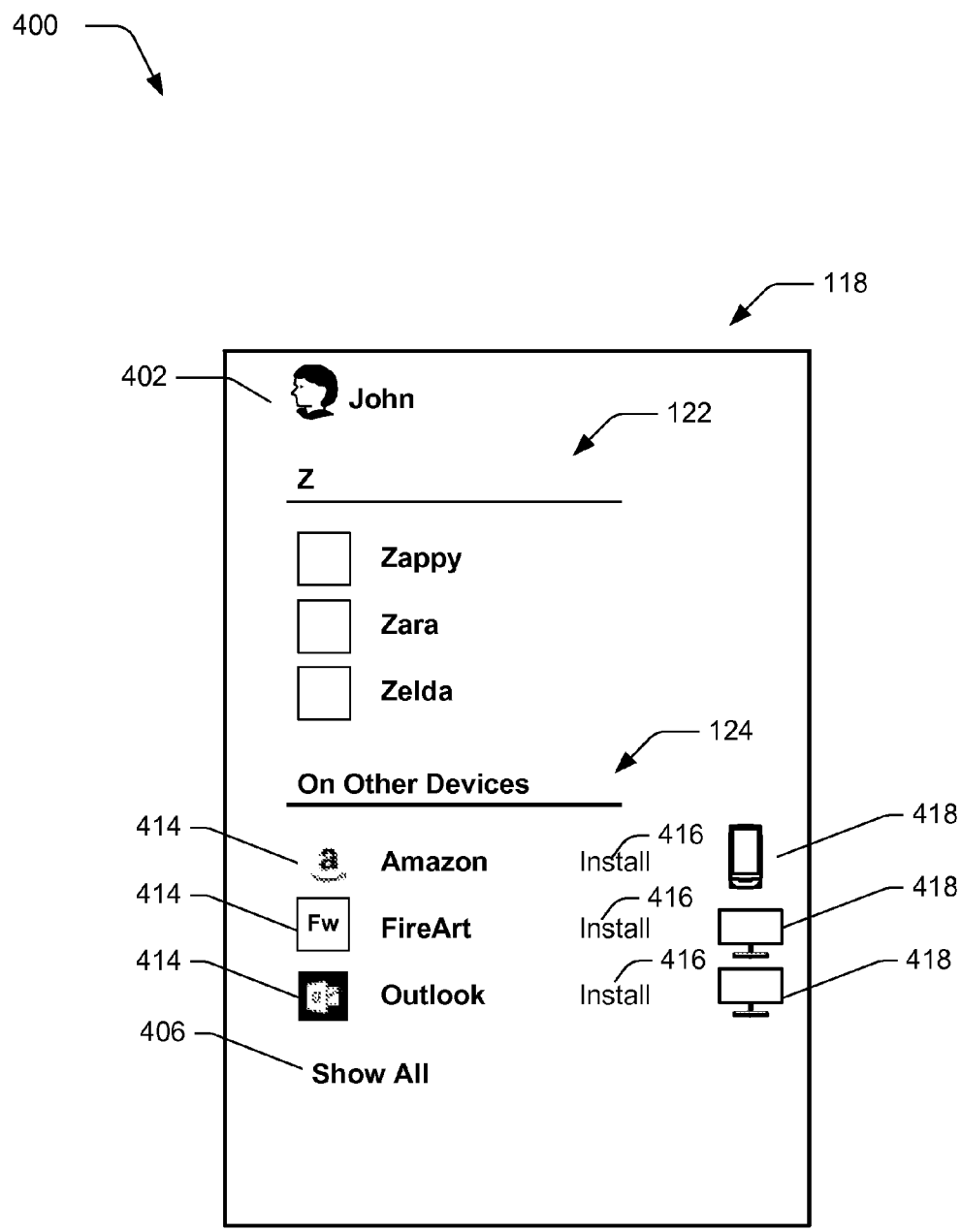
FIG. 4f illustrates an example of an on other devices section of an application launcher interface in accordance with one or more implementations.

When the application is finished downloading, application manager module 116 removes the Destiny application from the on other devices section, as illustrated in FIG. 4f. Note also that application manager module 116 has moved up the FireArt application one spot, and added the Outlook application to the on other devices section 124 to replace the destiny application.

Example Methods

The methods described herein are shown as sets of blocks that specify operations performed but are not necessarily limited to the order or combinations shown for performing the operations by the respective blocks. The techniques are not limited to performance by one entity or multiple entities operating on one device.

Figure 5:
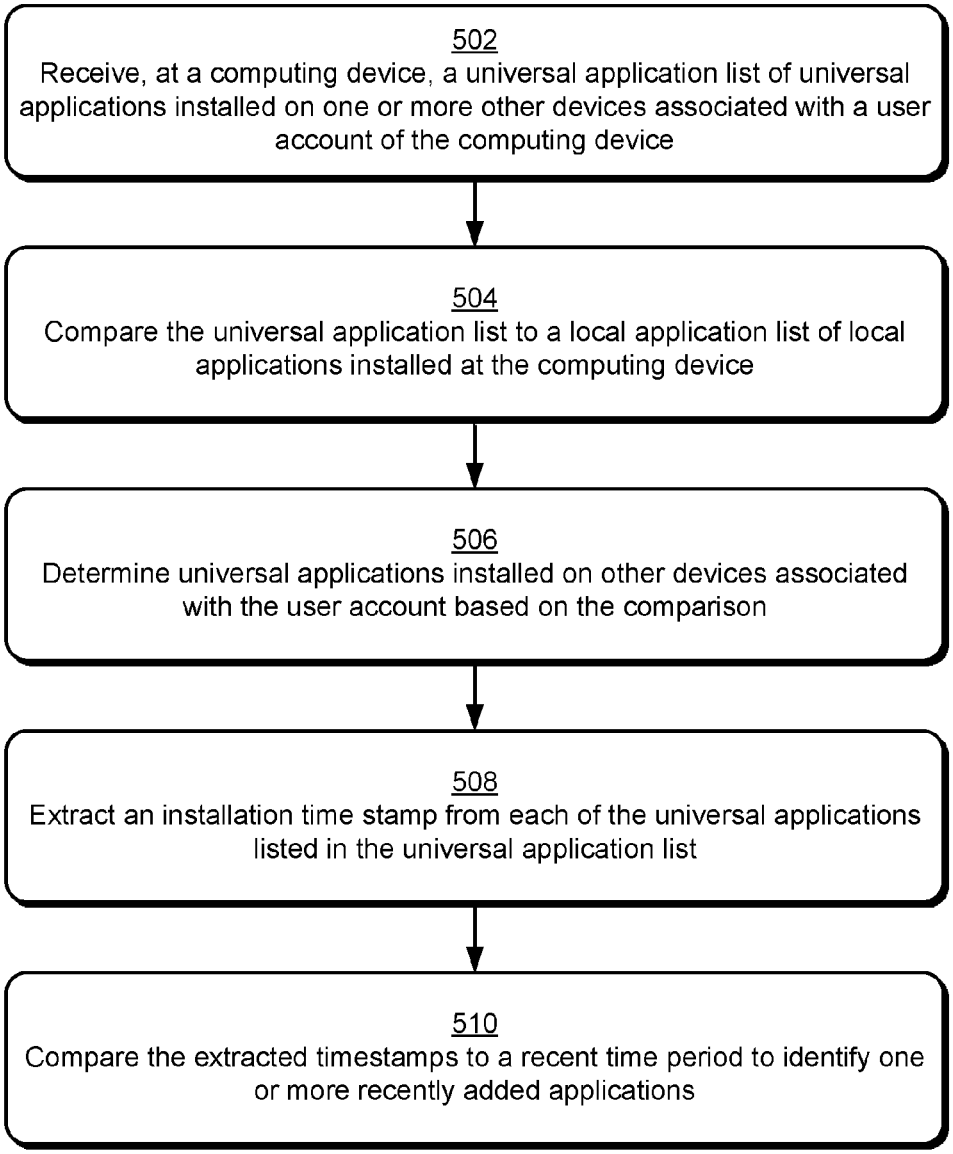
FIG. 5 illustrates an example method of identifying universal applications installed on other devices associated with a user account in accordance with one or more implementations.

FIG. 5 illustrates an example method 500 of identifying universal applications installed on other devices associated with a user account in accordance with one or more implementations.

At 502, a universal application list of applications is received at a computing device. The universal application list identifies universal applications installed on one or more other devices associated with a user account of the computing device. For example, application manager module 116 receives universal application list 114 at computing device 102 which identifies universal applications 108 installed at other devices associated with user account 110.

At 504, the universal application list is compared to a local application list of local applications installed at the computing device, and at 506 universal applications installed on other devices associated with the user account are determined. For example, application manager module 116 compares universal application list 114 to local application list 306 and determines universal applications on other devices 304 that are not installed at computing device 102.

Alternately or additionally, at 508, an installation time stamp is extracted from the universal applications listed in the universal application list. For example, application manager module 116 extracts installation timestamp 204 from the universal applications listed in universal application list 114.

At 510, the extracted timestamps are compared to a recent time period to identify one or more recently added applications. For example, application manager module 116 compares the extracted installation time stamps 204 to recent time period 310 to identify one or more recently added applications 308.

Figure 6:
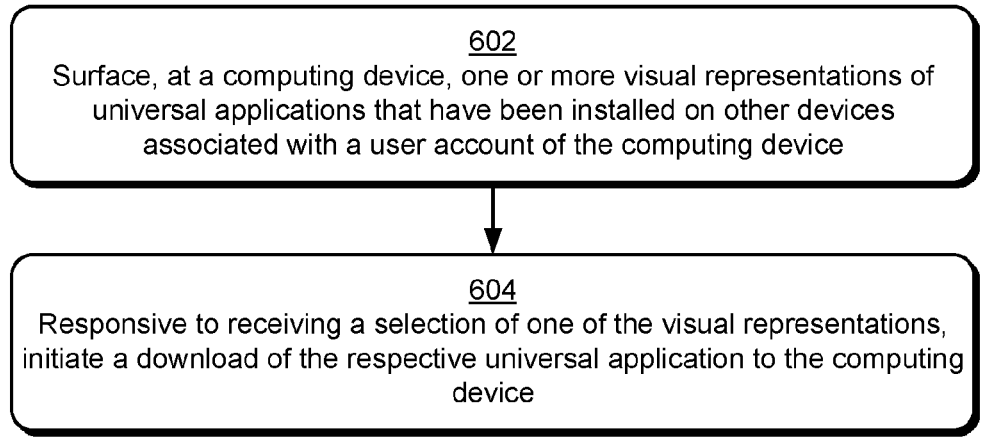
FIG. 6 illustrates an example method of surfacing visual representations of universal applications in accordance with one or more implementations.

FIG. 6 illustrates an example method 600 of surfacing visual representations of universal applications in accordance with one or more implementations.

At 602, one or more visual representations of universal applications that have been installed on other devices associated with a user account are surfaced at a computing device. For example, application manager module 116 surfaces visual representations 404 of universal applications that have been installed on other devices associated with user account 110 in recently added section 126 of application launcher interface 118. Alternately or additionally, application manager module 116 surfaces visual representations 414 of applications that have been installed on other devices associated with user account 110 in on other devices section 124 of application launcher interface 118.

At 604, responsive to receiving a selection of one of the visual representations, a download of the respective application to the computing device is initiated. For example, application manager module 116 initiates a download of a respective universal application 108 responsive to selection of one of the visual representations 404 or 414.

Example System and Device

Figure 7:
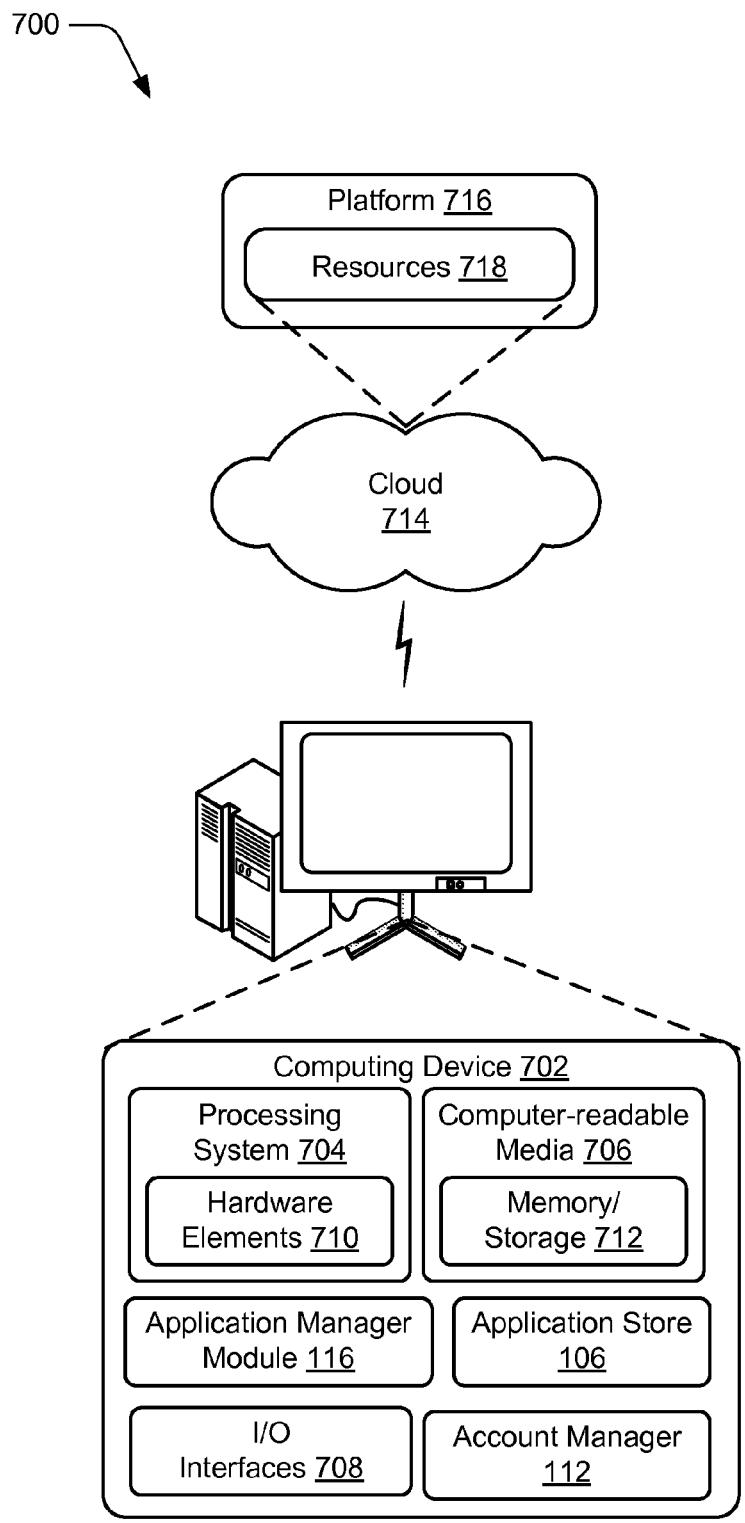
FIG. 7 illustrates an example system that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. This is illustrated through inclusion of application store 106, account manager 112, and application manager module 116 which may be configured to implement surfacing visual representations of universal applications as previously described.

The computing device 702 may be, for example, a server of a service provider, a device associated with a client (e.g., a client device), an on-chip system, and/or any other suitable computing device or computing system. The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interfaces 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion and Example Implementations

Example implementations described herein include, but are not limited to, one or any combinations of one or more of the following examples:

A computer-implemented method comprising: surfacing, in an application launcher interface of a computing device, one or more visual representations of universal applications that have been installed on one or more other devices associated with a user account of the computing device; and responsive to receiving a selection of one of the visual representations, initiating a download of the respective universal application to the computing device.

A computer-implemented method as described above, further comprising presenting, proximate each visual representation, a visual device identifier which identifies the device on which the universal application was originally installed.

A computer-implemented method as described above, further comprising removing the visual device identifier after the respective universal application is downloaded to the computing device.

A computer-implemented method as described above, wherein the selection comprises a single click or tap on the visual representation.

A computer-implemented method as described above, wherein the one or more visual representations of universal applications that have been installed on other devices is surfaced in an on other devices section of the application launcher interface.

A computer-implemented method as described above, further comprising, responsive to downloading the respective universal application to the computing device, removing the visual representation of the downloaded universal application from the on other devices section of the application launcher interface.

A computer-implemented method as described above, wherein the one or more visual representations of universal applications that have been installed on other devices is surfaced in a recently added section of the application launcher interface.

A computer-implemented method as described above, wherein the recently added section of the application launcher interface includes at least one visual representation of an application that was recently installed locally on the computing device.

A computer-implemented method as described above, further comprising, responsive to receiving the selection of the visual representation, presenting proximate the visual representation of the respective universal application a download status visual indicating the status of the download of the universal application to the computing device.

A computer-implemented method as described above, wherein the application launcher interface is contained within a start menu interface of the computing device.

A computer-implemented method as described above, wherein the surfacing is performed in response to a user sign-in to the user account on the computing device.

A computing device comprising: a display device; at least one processor; and one or more computer-readable storage media including instructions stored thereon that, responsive to execution by the at least one processor, cause the computing device to perform operations comprising: receiving a universal application list of universal applications installed on one or more other devices associated with a user account of the computing device; comparing the universal application list to a local application list of applications installed on the computing device; based on the comparison, determining one or more universal applications installed on other devices associated with the user account which are not installed on the computing device; and displaying, on the display device, one or more visual representations of the universal applications installed on other devices in an application launcher interface, each visual representation selectable to initiate download of the respective universal application to the computing device.

A computing device as described above, wherein the operations further comprise: extracting an installation timestamp from each universal application included in the universal application list; comparing each installation timestamp to a recent time period to identify one or more recently added universal applications which were installed within the recent time period; and displaying visual representations of the recently added universal applications in a recently added section of the application launcher.

A computing device as described above, wherein the one or more visual representations of the universal applications installed on other devices are displayed in an on other devices section of the application launcher interface.

A computing device as described above, wherein the operations further comprise displaying, on the display device, a visual device identifier of the device on which the universal application was installed proximate each visual representation of the universal applications installed on other devices.

A computer-implemented method comprising: surfacing, at a computing device, visual representations of recently installed applications, the visual representations including at least one visual representation of a universal application that is installed on an additional device associated with a user account; presenting, proximate the at least one visual representation of the universal application, a download control selectable to download the universal application to the device; and responsive to receiving a selection of the download control, downloading the universal application to the computing device.

A computer-implemented method as described above, wherein the visual representations include at least one visual representation of a local application that is installed on the computing device.

A computer-implemented method as described above, further comprising after downloading the universal application to the computing device: receiving a selection of the visual representation of the universal application; and launching the universal application at the computing device.

A computer-implemented method as described above, further comprising presenting, proximate the visual representation of the universal application, a visual device identifier which identifies the device on which the universal application was originally installed.

A computer-implemented method as described above, wherein the selection comprises a single click or tap on the visual representation.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer-implemented method comprising:
    receiving, at a computing device, authentication credentials to sign in to a user account, the user account managed by an account manager that tracks universal applications that are installed at the computing device and at one or more other devices that are also associated with the user account;
    responsive to signing in to the user account, communicating with the account manager to determine the tracked universal applications;
    surfacing, in an application launcher interface of the computing device, one or more visual representations of universal applications that have been installed on the one or more other devices that are not yet installed on the computing device, the one or more visual representations of universal applications that have been installed on other devices surfaced in at least one of a "recently added" section of the application launcher interface which presents applications that have been installed on either of the one or more other devices or the computing device or an "on other devices" section of the application launcher interface which presents applications that have been installed on the one or more other devices but have not yet been installed on the computing device;
    presenting, proximate each visual representation, a visual device identifier which identifies the device on which the universal application was originally installed; and
    responsive to receiving a selection of one of the visual representations, initiating a download of the respective universal application to the computing device, the downloading of the respective universal application causing removal of the respective visual device identifier.

2. The computer-implemented method of claim 1, wherein the selection comprises a single click or tap on the visual representation.

3. The computer-implemented method of claim 1, further comprising, responsive to downloading the respective universal application to the computing device, removing the visual representation of the downloaded universal application from the "on other devices" section of the application launcher interface.

4. The computer implemented method of claim 1, wherein the "recently added" section of the application launcher interface includes at least one visual representation of an application that was recently installed locally on the computing device.

5. The computer-implemented method of claim 1, further comprising, responsive to receiving the selection of the visual representation, presenting proximate the visual representation of the respective universal application a download status visual indicating the status of the download of the universal application to the computing device.

6. The computer implemented method of claim 1, wherein the application launcher interface is contained within a start menu interface of the computing device.

7. The computer-implemented method of claim 1, wherein the one or more other devices have a different platform than the computing device.

8. A computer-implemented method comprising:
    receiving, at a computing device, authentication credentials to sign in to a user account, the user account managed by an account manager that tracks universal applications that are installed at the computing device and at one or more additional devices that are also associated with the user account;
    responsive to signing in to the user account, communicating with the account manager to determine the tracked universal applications;
    surfacing, at the computing device, visual representations of recently installed applications, the visual representations including at least one visual representation of a universal application that is installed on an additional device associated with the user account and not yet installed on the computing device, the one or more visual representations of universal applications that have been installed on additional devices surfaced in at least one of a "recently added" section of an application launcher interface which presents applications that have been installed on either of the one or more additional devices or the computing device or an "on other devices" section of the application launcher interface which presents applications that have been installed on the one or more additional devices but have not yet been installed on the computing device;
    presenting, proximate the at least one visual representation of the universal application, a download control selectable to download the universal application to the computing device;
    presenting, proximate the visual representation of the universal application, a visual device identifier which identifies the device on which the universal application was originally installed; and
    responsive to receiving a selection of the download control, downloading the universal application to the computing device, the downloading of the universal application causing removal of the respective visual device identifier.

9. The computer-implemented method of claim 8, wherein the visual representations include at least one visual representation of a local application that is installed on the computing device.

10. The computer-implemented method of claim 8, further comprising after downloading the universal application to the computing device:
    receiving a selection of the visual representation of the universal application; and
    launching the universal application at the computing device.

11. The computer-implemented method of claim 8, wherein the selection comprises a single click or tap on the visual representation.

12. The computer-implemented method of claim 8, wherein the one or more additional devices have a different platform than the computing device.

13. A computing device comprising:
    a display device;
    at least one processor; and
    one or more computer-readable storage media including instructions stored thereon that, responsive to execution by the at least one processor, cause the computing device to perform operations comprising:

receiving, at the computing device, authentication credentials to sign in to a user account, the user account managed by an account manager that tracks universal applications that are installed at the computing device and at one or more other devices that are also associated with the user account;

responsive to signing in to the user account, communicating with the account manager to determine the tracked universal applications;

surfacing, in an application launcher interface of the computing device, one or more visual representations of universal applications that have been installed on the one or more other devices that are not yet installed on the computing device, the one or more visual representations of universal applications that have been installed on other devices surfaced in at least one of a "recently added" section of the application launcher interface which presents applications that have been installed on either of the one or more other devices or the computing device or an "on other devices" section of the application launcher interface which presents applications that have been installed on the one or more other devices but have not yet been installed on the computing device;

presenting, proximate each visual representation, a visual device identifier which identifies the device on which the universal application was originally installed; and responsive to receiving a selection of one of the visual representations, initiating a download of the respective universal application to the computing device, the downloading of the respective universal application causing removal of the respective visual device identifier.

14. The computing device of claim 13, wherein the selection comprises a single click or tap on the visual representation.

15. The computing device of claim 13, wherein the operations further comprise, responsive to receiving the selection of the visual representation, presenting proximate the visual representation of the respective universal application a download status visual indicating the status of the download of the universal application to the computing device.

16. The computing device of claim 13, wherein the application launcher interface is contained within a start menu interface of the computing device.

17. The computing device of claim 13, wherein the operations further comprise, responsive to downloading the respective universal application to the computing device, removing the visual representation of the downloaded universal application from the "on other devices" section of the application launcher interface.

18. The computing device of claim 13, wherein the "recently added" section of the application launcher interface includes at least one visual representation of an application that was recently installed locally on the computing device.

19. The computing device of claim 13, wherein the application launcher interface is contained within a start menu interface of the computing device.

20. The computing device of claim 13, wherein the one or more other devices have a different platform than the computing device.

* * * * *